United States Patent Office 2,927,601
Patented Mar. 8, 1960

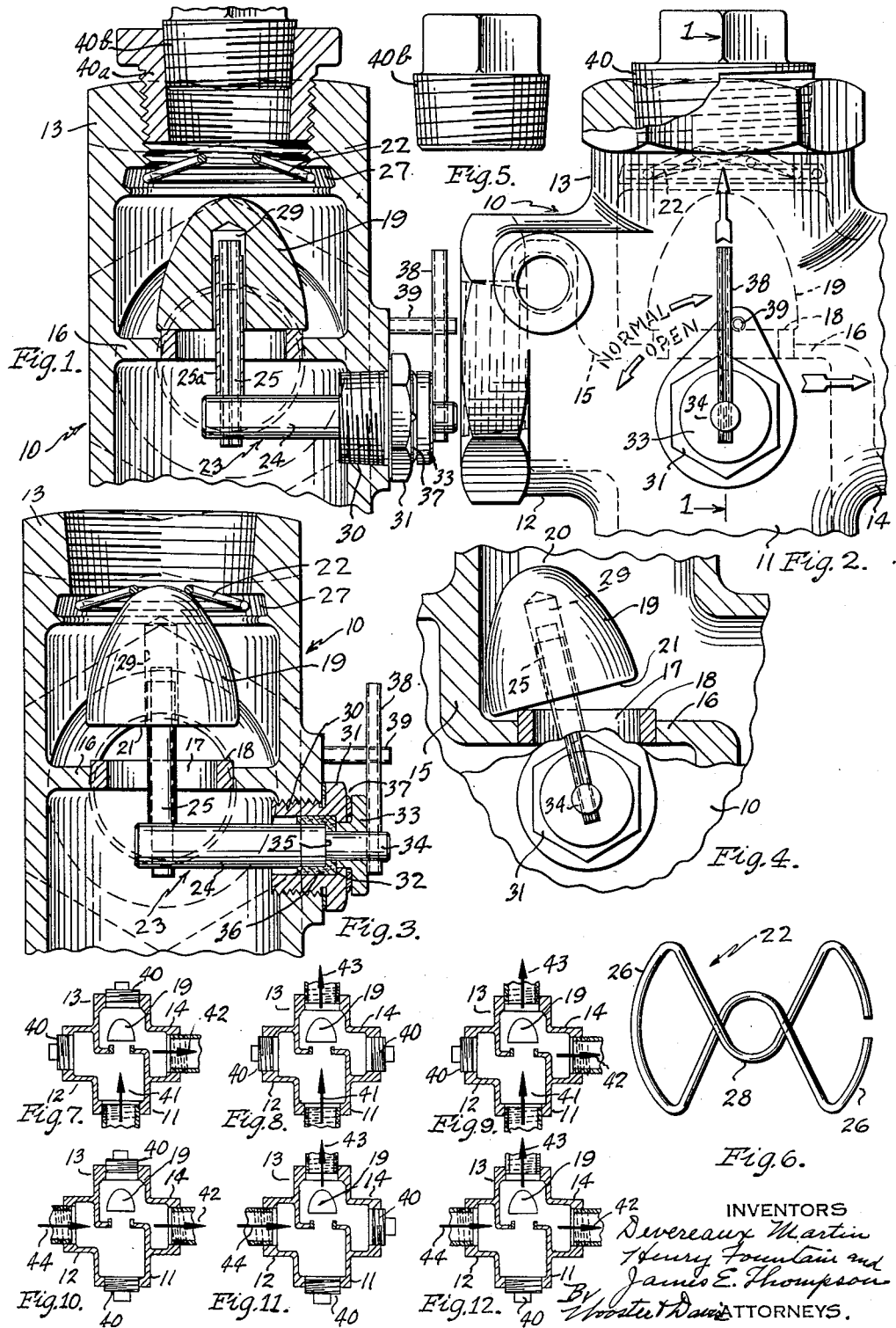
March 8, 1960 D. MARTIN ET AL 2,927,601
UNIVERSAL FLOW VALVE
Filed Jan. 3, 1957
INVENTORS
Devereaux Martin
Henry Fountain and
James E. Thompson
ATTORNEYS

2,927,601

UNIVERSAL FLOW VALVE

Devereaux Martin, Chester, Henry Fountain, Madison, and James E. Thompson, East Haddam, Conn., assignors to Viking Instruments, Incorporated, East Haddam, Conn., a corporation of New York Application January 3, 1957, Serial No. 632,371

7 Claims. (Cl. 137—271)

This invention relates to a so-called "flow" or "flow-check" valve for circulating hot water heating systems for dwellings, and has for an object to provide an improved and simplified valve construction for this use, which may be readily set to either the normal or operating position or an open position to permit fluid to flow back through the system.

It is also an object to provide a structure of valve for this purpose which is universal in that it has greatly increased installation possibility, and is adapted for installation in any one of the usual positions required in such circulating systems where previously with conventional valve structures several different types or structures were required.

With the foregoing and other objects in view, we have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a vertical section substantially on line 1—1 of Fig. 2 showing the valve or stopper in the closed position;

Fig. 2 is a side view looking from the right of Fig. 1;

Fig. 3 is a section similar to Fig. 1 showing the valve in the open position;

Fig. 4 is a partial section taken at right angles to Fig. 3 showing the valve stopper set to permit flow back through the valve;

Fig. 5 is a side view of a portion of a reducing connection plug;

Fig. 6 is a plan view of a stop spring for the valve, and

Figs. 7 to 12 are sections through the valve showing somewhat diagrammatically the different installations for which the valve is adapted to secure substantial universal use of the valve for all the installations usually encountered in these systems, and illustrating how this same valve can be used for all of them.

It is common practice in dwelling space heated by circulating hot water systems to employ a so-called "flow" or "flow-check" valve, which is installed in the piping in the hot water feed line to the radiating system. A common type of this valve comprises a gravity-operated or spring-held valve which closes to prevent thermosyphoning of the water when the forced circulating pump is not operating. The circulating pump when operating creates enough pressure to open the valve and permit fluid circulation to the heating or radiating system. At present the valves usually available require different valve structures for different arrangements of the circulating pipes of the system, each valve being adapted for use in only one or possibly two different pipe arrangements. It is therefore an object of the present invention to produce a valve which is adapted for use in all the different arrangements of the circulating pipes apt to be encountered in these systems, thus requiring the provision of only a single type of valve and doing away with the necessity of stocking a number of different valve structures. From the point of view of the plumber, a truly universal arrangement in connections is desirable in a single valve structure that would accommodate vertical and horizontal piping and combinations thereof. Such adaptability, in addition to being convenient, materially minimizes inventory requirements. These objects are effectively secured with this novel valve structure.

This flow valve is so constructed that it has six possible connection arrangements, as illustrated in Figs. 7 to 12, all being accomplished with the single valve. The additional flexibility is obtained by the use of supplementary connection ports, together with a novel manual valve lifting arrangement.

The valve stopper in a flow check valve must have two possible positions, either of which may be selected manually by an adjustment on the exterior of the valve assembly. One position, which may be termed the "normal" or "operating" position, will permit flow only when the system circulator pump is functioning. The alternate position is termed "open" and permits fluid to flow back when the system is being drained, even when the circulating pump is not operating.

The valve as specifically illustrated comprises a body 10 having four branches 11, 12, 13 and 14 arranged at right angles to each other, and with the specific arrangement of valve shown either 11 or 12 may be the inlets, while 13 and 14 are the outlets. Between the branches 11 and 12 and the branches 13 and 14 is a cross wall 15 including a horizontal portion 16 provided with a flow opening 17 therethrough surrounded by a valve seat 18. Each of the extensions or branches 13 and 14 are provided with means for connection to pipes of the circulating system. In the arrangement shown each is internally threaded with the usual pipe threading for connection to the usual threaded pipe.

The valve includes a movable valve stopper 19 which in the form shown is of general conical shape with a rounded upper end or apex 20 and a flat lower end 21 adapted to seat on the valve seat 18 when the valve is closed and cut off flow through the passage 17. This valve may be inserted into the valve body through the opening in the upper connection 13 and is retained therein by a spring 22 and a hand operable shaft 23 comprising a horizontal portion 24 and a vertical portion 25 at right angles thereto, which may also include a dampening sleeve 25a. The spring 22 may be of any suitable construction, but that shown in Fig. 6 is preferred. It is made of spring wire bent to substantially a figure 8 shape, with curved outer end portions 26 adapted to seat in a channel 27 in the vertical extension 13 of the body above this stopper, which end portions are connected by a central loop 28 immediately over the stopper to provide a stop means to limit upward movement of the stopper, as indicated in Fig. 3. The stopper is guided in this movement by the upper end portion of the vertical extension 25 of the shaft passing with a generous loose fit into a blind opening or socket 29 extending upwardly from the lower end of the stopper 19. The coaction of this socket or opening with the portion 25 of the shaft provides a centering and guiding means for the stopper and permits limited upward movement of the stopper from its closed position of Fig. 1 seated on the valve seat 18 to its open position of Fig. 3, which is limited by the spring 22.

The shaft 23 is mounted for limited rotating movement so that the stopper may be shifted manually from its normal or operative positions of Figs. 1 and 2 to a stationary open position as shown in Fig. 4, to permit backward flow through the valve when the circulating pump to the system is not operating, to permit draining of the system. For this purpose, the shaft is mounted in a sleeve 30 threaded into an opening in one side of the body 10, and it may have a hex head 31 for the use of a wrench. It has a shoulder 32 surrounding an opening in which is a headed sleeve 33 on a reduced outer end portion 34 of the shaft, thus forming a shoulder 35 between which and the shoulder 32 is a suitable packing 36 to prevent leakage. Also under the head of the sleeve 33 and between this sleeve and the head of the sleeve 30 is a friction inducing means comprising a spring washer 37 tending to shift the shaft outwardly and clamp the packing between the shoulders 32 and 35. Means is provided by which the shaft may be turned a short distance to shift the valve member or stopper 19 to the angular or open position of Fig. 4 or to shift it back to the normal or operating position of Figs. 1 and 3. This comprises a pin 38 forming a suitable handle to the outer end portion 34 of the shaft, and a stop pin 39 is provided to limit movement of this pin and therefore the shaft from its position of Fig. 4 to the normal operating position of Figs. 1, 2 and 3. The generous loose fit between the upright or vertical portion 25 of the shaft and the opening 29 in the valve stopper permits free movement of the valve stopper between the closed and open positions of Figs. 1 and 3, and also permits shifting of this stopper to the open position of Fig. 4. The spring washer 37 and packing 36 provide sufficient friction to permit positive positioning of the shaft in either of the positions of Figs. 1 and 3 or Fig. 4. There is a suitable gasket provided between the head 31 of sleeve 30 and the valve body.

For open setting of Fig. 4 the shaft 23 may be rotated so that there is an angular displacement of the stopper 19 with respect to its original axis or center axis of the valve, as shown in Figs. 1 and 3. Since there is a free fit between the stopper and the vertical portion 25 of the shaft, there is a leverage created by the bearing of the stopper on the seat and the rotation of the shaft, thus lifting the stopper as shown in Fig. 4. This will permit opening of the valve for back flow or draining of the system through the valve when the circulating pump is not operating.

During normal operation, after the shaft is swung back to its normal position of Figs. 1, 2 and 3, the valve stopper may be shifted between the closed position of Fig. 1 and the open position of Fig. 3. When the circulating pump is operating, the pressure of the circulating water on the valve stopper lifts it from the closed position of Fig. 1 to the open position of Fig. 3, there being plenty of clearance around this stopper in this position for flow of the water past and through the valve, so that it may exit through either of the branches 13 or 14, the spring 22 permitting free flow through the upper branch 13. When the circulating pump stops, stopper 19 drops automatically of its own weight from the open position of Fig. 3 to the closed position of Fig. 1, thus preventing thermosyphoning of the water when there is no circulation induced by the operation of the pump. The shaft and handle 38 provide a side actuated stopper lifting feature, which being side actuated, leaves the upper portion of the valve body free for the utility of a top connection port.

The somewhat diagrammatical sections of Figs. 7 to 12 illustrates the universality of this valve where it accommodates itself to the various arrangements of circulating pipes encountered in these systems, so that this single valve may be used for all of these installations, doing away with the necessity of having several specific valve structures for this purpose. As shown, either branch 11 or 12 may be used as the inlet or input branch, with either or both branches 13 and 14 as the outlet or output branches, those not being connected to either an inlet or outlet circulating pipe being closed by a removable plug 40 threaded into the tapped opening therein. If smaller pipes are to be connected a reducing plug, as shown at 40a and 40b in Figs. 1 and 5 may be used. Thus the six possible installations or connections illustrated provide for different directions of flow, as indicated by the arrows, and they are indicated as horizontal and vertical to describe the direction of input and output piping or runs. Thus:

(1) As indicated in Fig. 7, there is a vertical input as indicated by the arrow 41, and horizontal output as indicated by the arrow 42;

(2) As indicated in Fig. 8, there is a vertical input as indicated by the arrow 41 and vertical output as indicated by arrow 43;

(3) As shown in Fig. 9, there is a vertical input 41 and horizontal and vertical outputs 42 and 43;

(4) As shown in Fig. 10, there is a horizontal input as shown by the arrow 44 and a horizontal output 42;

(5) As shown in Fig. 11 there is a horizontal input as shown by the arrow 44 and a vertical output 43, and (6) As shown in Fig. 12 there is a horizontal input 44 and a horizontal output 42 and vertical output 43.

It will therefore be clear from the above that this provides a very simple and effective valve structure, which when the circulating pump is operating permits a free circulation of the water through the system, and when the circulation stops immediately and automatically closes to prevent thermosyphoning of water when the pump is not operating; also that this construction permits the valve to be readily opened by hand and retained in this position to permit backward flow through the valve and draining of the system when desired; further, that the construction of the valve makes it capable of universal application for this type of system in that this same valve can be used for the six different arrangements of circulating pipes which may be encountered in this type of system, as illustrated in Figs. 7 to 12, thus permitting the use of this single valve in all the different installations, and doing away with the necessity of providing a number of different valve structures or forms to fulfill the requirements of such installations.

Having thus set forth the nature of our invention, we claim:

1. A flow control valve comprising a body having four branches arranged in two pairs with the branches of each pair in alignment and the pairs arranged at right angles to each other, each branch provided with means for connection to a pipe of a circulating system, a cross wall in the body located between the branches of each pair separating them into two inlet and two outlet branches, the two inlet branches located at right angles to each other providing respectively a vertical and a horizontal inlet branch and the two outlet branches also located at right angles to each other providing respectively a vertical and a horizontal outlet branch, said cross wall provided with a flow passage therethrough surrounded by a horizontal valve seat on the outlet side, an upright substantially conically shaped valve stopper on the outlet side of the cross wall adapted to rest at its lower end on said seat to prevent reverse flow from the outlet to the inlet side of said wall, and means for guiding said stopper for free movements vertically to and from the valve seat.

2. The flow control valve according to claim 1 in which the guiding means for the stopper comprises a blind opening extending longitudinally inwardly from its lower side, and a shaft having a horizontal portion mounted for turning movements in a side wall of the body, and a vertical portion extending through the flow passage having a free end portion extending into said blind opening with a loose fit therein.

3. The flow control valve according to claim 1 in which the guiding means for the stopper comprises a socket extending upwardly from its lower end, a shaft comprising a horizontal portion and a vertical portion, means mounting the horizontal portion for turning movements in a side wall of the body with the vertical portion extending through the flow opening and into said socket with a loose fit therein, means providing sufficient friction on the horizontal portion of the shaft to retain it in different positions to which it is turned, and manual means on the shaft outside the body to turn the shaft to shift the stopper from its closed position.

4. A flow valve comprising a body member having inlet and outlet connections adapted for connection to inlet and outlet pipes of a circulating system, a cross wall in said body separating the inlet and outlet connections and provided with a flow passage therethrough surrounded by a horizontal valve seat on the outlet side of said wall, an upright substantially circular valve stopper adapted to seat at its lower end on said seat and movable vertically to and from said seat to close and open said passage for flow control against thermo-siphoning, means for guiding the stopper in said movements comprising a longitudinal socket extending inwardly from the lower wall of the stopper, a shaft comprising horizontal and vertical portions, means mounting the horizontal portion for turning movements in a side wall of the body with the free end of the vertical portion passing through said passage and into the socket with a loose fit therein to permit free movement of the valve while guiding it for vertical movement to and from the valve seat, and means outside the body for turning the shaft to shift the stopper and tilt it laterally from the closed position to permit reverse flow through the valve.

5. The flow control valve according to claim 4 in which there is means for providing sufficient friction on the horizontal turnable portion of the shaft to retain it in the different positions to which it is turned.

6. The flow control valve according to claim 4 in which the connections include an outlet connection in alignment with the flow passage, the stopper is of substantially conical shape with its base seatable on the valve seat, and there is a wire stop between the valve and the outlet and spaced from the valve in its closed position to limit opening movement of the valve from said seat while permitting free flow of fluid from the flow passage to the outlet.

7. A flow control valve comprising a body member having a pair of inlet connections at right angles to each other one of which is a vertical and the other a horizontal connection, a pair of outlet connections at right angles to each other one of which is a vertical and the other a horizontal connection, means whereby said connections may be connected to pipes of a fluid circulating system, said connections being arranged so that each outlet connection is in alignment with an inlet connection, a cross wall in the body between the inlet and outlet connections and provided with a flow passage therethrough surrounded by a horizontal valve seat on the outlet side of said wall, an upright substantially conically shaped valve stopper adapted to seat at its lower end on said seat for flow control against thermo-siphoning and movable vertically therefrom by fluid pressure on the under side of the stopper, and means guiding said stopper in its movements to and from the valve seat.

References Cited in the file of this patent

UNITED STATES PATENTS

| | | |
|---|---|---|
| 202,785 | Brown | Apr. 23, 1878 |
| 1,367,911 | Koplin | Feb. 8, 1921 |
| 2,078,315 | Coltman | Apr. 27, 1937 |
| 2,193,270 | Coleman | Mar. 12, 1940 |
| 2,641,437 | Jay | June 9, 1953 |
| 2,777,663 | Axlander | Jan. 15, 1957 |

FOREIGN PATENTS

| | | |
|---|---|---|
| 1,002,339 | France | of 1952 |